US 8,077,694 B2

(12) United States Patent
Doss et al.

(10) Patent No.: US 8,077,694 B2
(45) Date of Patent: Dec. 13, 2011

(54) INTELLIGENT SCHEDULING IN A TIME DIVISION DUPLEXING SYSTEM TO MITIGATE NEAR/FAR INTERFERENCE SCENARIOS

(75) Inventors: William K. Doss, Lake-in-the-Hills, IL (US); Alan P. Rottinghaus, Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1275 days.

(21) Appl. No.: 11/563,701

(22) Filed: Nov. 28, 2006

(65) Prior Publication Data
US 2008/0123569 A1    May 29, 2008

(51) Int. Cl.
*H04B 7/212* (2006.01)
(52) U.S. Cl. .......................... 370/347; 370/329; 455/450
(58) Field of Classification Search ................ 455/456.1, 455/456.2; 370/347
See application file for complete search history.

(56) References Cited

U.S. PATENT DOCUMENTS

| 2004/0147267 | A1 | 7/2004 | Hill et al. | |
| 2005/0089084 | A1* | 4/2005 | Mahany | 375/130 |
| 2006/0234755 | A1 | 10/2006 | Jonsson et al. | |
| 2007/0147333 | A1* | 6/2007 | Makhijani | 370/347 |

OTHER PUBLICATIONS

A Grid-distance based scheduling for grid resource management published in 2005 by IEEE.*

* cited by examiner

*Primary Examiner* — Rafael Pérez-Gutiérrez
*Assistant Examiner* — German Viana Di Prisco

(57) ABSTRACT

A wireless communication system (100), method, and site controller (112) schedule at least one of transmission and reception of wireless data by at least one wireless communication device. A distance is determined between at least one wireless communication device (104) and a base station (108) in a wireless communication cell (402). At least one of a downlink subframe (610) and an uplink subframe (614) of a time division duplexing frame (602) is segmented into a plurality of segments. The at least one wireless communication device (104) is scheduled into at least one of the plurality of segments of the downlink subframe (610) and the uplink subframe (614) based on the distance determined between the at least one wireless communication device (104) and the base station (108).

17 Claims, 6 Drawing Sheets

INTELLIGENT SCHEDULING IN A TIME DIVISION DUPLEXING SYSTEM TO MITIGATE NEAR/FAR INTERFERENCE SCENARIOS

REFERENCE TO RELATED APPLICATION

This application is related to a co-pending application, Ser. No. 11/399,630, entitled "A METHOD AND APPARATUS FOR DYNAMIC ADJUSTMENT OF ORTHOGONAL FREQUENCY-DIVISION MULTIPLEXING DURING CONGESTED CONDITIONS," filed Apr. 6, 2006, which is assigned to the assignee of the present application.

This application is related to a co-pending application, Ser. No. 11/536,224, entitled "MITIGATING SYNCHRONIZATION LOSS," filed Sep. 28, 2006, which is assigned to the assignee of the present application.

FIELD OF THE INVENTION

The present invention generally relates to the field of wireless communications, and more particularly relates to scheduling transmission/reception of wireless data in a time division duplexing system.

BACKGROUND OF THE INVENTION

Wireless communication systems have evolved greatly over the past few years. Current wireless communication systems are capable of transmitting and receiving broadband content such as streaming video and audio. One communication scheme used in today's wireless communication systems is time division duplex ("TDD"). TDD allows for the transmission and reception of data on a single frequency. In a TDD system, communication devices such as base stations and wireless subscriber devices must be synchronized with each other. For example, because the same frequency is used for transmitting and receiving data, if a wireless subscriber device is transmitting while a neighboring device is trying to receive there is potential interference between the two devices. Also, two wireless subscriber devices can be on the edges of adjacent communication cells and be transmitting/receiving from their respective base stations. In this situation either of the base stations receive interfering signals from the other communication cell at similar power levels to the desired transmission.

If one of the base stations in the TDD system loses TX/RX synchronization a stability oscillator at the base station tries to keep the base station in sync with the rest of the system. However, stability oscillators usually only allow a free-run time of hours. One way to mitigate synchronization loss is to equip each site with a stability oscillator, which allows the site to free-run for some amount of time (usually 24-48 hours). One problem with stability oscillators is that they are expensive. Another problem with stability oscillators is that they offer a limited amount of free-run time. In other words, stability oscillators have a maximum drift rate usually measurable by hours before the base station will cause serious problems for the system. If the base station cannot be repaired within the maximum drift rate time, the base station needs to be shut down. In some instances, a repair crew might not be able to reach the base station until well after the maximum drift time of the stability oscillator. Additionally, current solutions for the near/far problem discussed above use a larger frequency reuse pattern. However, this may not be practical for operators with limited spectrum or in dense urban environments comprising numerous small cells.

Therefore a need exists to overcome the problems with the prior art as discussed above.

SUMMARY OF THE INVENTION

Briefly, in accordance with the present invention, disclosed are a wireless communications system, method, and site controller for scheduling at least one of transmission and reception of wireless data by at least one wireless communication device are disclosed. The method includes determining a distance between at least one wireless communication device and a base station in a wireless communication cell. At least one of a downlink subframe and an uplink subframe of a time division duplexing frame is segmented into a plurality of segments. The at least one wireless communication device is scheduled into at least one of the plurality of segments of the downlink subframe and the uplink subframe based on the distance determined between the at least one wireless communication device and the base station.

In another embodiment, a wireless communications system for scheduling at least one of transmission and reception of wireless data by at least one wireless communication device is disclosed. The wireless communications system comprises a plurality of wireless devices and a plurality of base stations communicatively coupled to the plurality of wireless devices. At least one information processing system communicatively coupled to the plurality of base stations is also included. The information processing system includes a range estimator for determining a distance between at least one wireless communication device in the plurality of the wireless devise and a base station in the plurality of the base stations. The range estimator also segments at least one of a downlink subframe and an uplink subframe of a time division duplexing frame into a plurality of segments. A scheduler schedules the at least one wireless communication device into at least one of the plurality of segments of the downlink subframe and the uplink subframe based on the distance determined between the at least one wireless communication device and the base station.

In yet another embodiment, a site controller that is communicatively coupled to at least one base station for scheduling at least one of transmission and reception of wireless data by at least one wireless communication device is disclosed. The site controller includes a range estimator for determining a distance between at least one wireless communication device in the plurality of the wireless devise and a base station in the plurality of the base stations. The range estimator also segments at least one of a downlink subframe and an uplink subframe of a time division duplexing frame into a plurality of segments. A scheduler schedules the at least one wireless communication device into at least one of the plurality of segments of the downlink subframe and the uplink subframe based on the distance determined between the at least one wireless communication device and the base station.

The at least one wireless communication device is scheduled into at least one of the plurality of segments of the downlink subframe and the uplink subframe based on the distance determined between the at least one wireless communication device and the base station. The wireless communication device may be scheduled into at least one middle segment of the plurality of segments of the downlink subframe and the uplink subframe if the distance determined between the base station and the at least one wireless communication device is greater a given distance threshold.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless communication device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

Wireless Communications System

Figure 1:
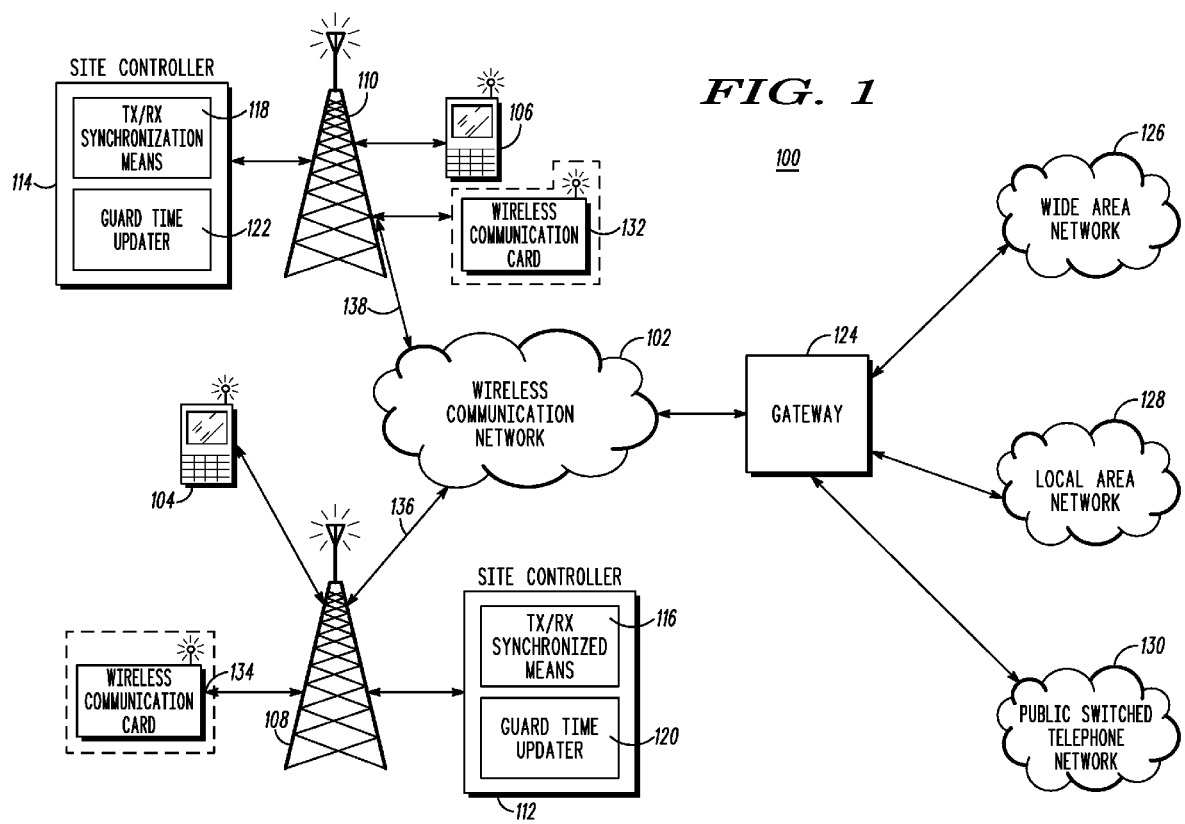
FIG. 1 is block diagram illustrating a wireless communications system, according to an embodiment of the present invention.

According to an embodiment of the present invention, as shown in FIG. 1, a wireless communications system 100 is illustrated. FIG. 1 shows a wireless communications network 102 that connects wireless communication devices 104, 106, 132, 134 to other wireless communication devices and/or to other networks such as a wide area network 126, a local area network 128, a public switched telephone network 130, and the like via a gateway 124. The wireless communications network 102 comprises a mobile phone network, a mobile text messaging device network, a pager network, a wireless broadband data network, and/or the like.

Further, the communications standard of the wireless communications network 102 of FIG. 1 comprises Code Division Multiple Access (CDMA), Time Division Multiple Access (TDMA), Global System for Mobile Communications (GSM), General Packet Radio Service (GPRS), Frequency Division Multiple Access (FDMA), Orthogonal Frequency Division Multiplexing (OFDM), or the like. Additionally, the wireless communications network 102 also comprises text messaging standards, for example, Short Message Service (SMS), Enhanced Messaging Service (EMS), Multimedia Messaging Service (MMS), or the like. The wireless communications network 102 also allows for push-to-talk over cellular communications between capable wireless communication devices and wireless broadband communications.

The wireless network 102 supports any number of wireless communication devices 104, 106, 132, 134. The support of the wireless network 102 includes support for mobile telephones, smart phones, text messaging devices, handheld computers, pagers, beepers, wireless communication cards, personal computers with wireless communication adapters, or the like. A smart phone is a combination of 1) a pocket PC, handheld PC, palm top PC, or Personal Digital Assistant (PDA), and 2) a mobile telephone. More generally, a smartphone can be a mobile telephone that has additional application processing capabilities.

In one embodiment, the wireless communications network 102 is capable of broadband wireless communications utilizing time division duplexing ("TDD") as set forth, for example, by the IEEE 802.16e standard. The IEEE 802.16e standard is further described in IEEE Std. 802.16e 2005. The duplexing scheme TDD allows for the transmissions of signals in a downstream and upstream direction using a single frequency. It should be noted that the present invention is not limited to an 802.16e system for implementing TDD. Other communication systems that the present invention may be applied to include UMTS LTE, 802.20 systems, and the like. Other such standards such as UMTS LTE (Long Term Evolution) and IEEE 802.20 are also applicable. Furthermore, the wireless communications system 100 is not limited to a system using only a TDD scheme. For example, TDD may be only used for a portion of the available communication channels in the system 100, while one or more schemes are used for the remaining communication channels.

The wireless communications system 100 also includes a group of base stations 108, 110 that are, for example, a common synchronization scheme. The base stations 108, 110, in one embodiment, are connected to the wireless communication network 102 via an Ethernet connection 136, 138. However, it should be noted that other communication standards can be used. Each base station 108, 110, in one embodiment, includes a site controller 112, 114. The synchronization, in one embodiment, is a time-based synchronization for transmitting and/or receiving wireless data. For example, in a wireless communications system using TDD (e.g. where transmitting and receiving is performed on the same frequency) synchronization between the base stations is necessary so that their respective wireless communication devices 104, 106, 132, 134 are not transmitting while the other wireless devices in the group are receiving and vice-versa. If this situation occurs, interference between the wireless devices 104, 106 can be created. Each base station 108, 110, in one embodiment, includes a site controller 112, 114.

Each base station 108, 110 (including the site controller 112, 114 that is coupled to the base station 108, 110) includes, in one embodiment, a range estimator 116, 118 for estimating how far a wireless communication device 104, 106, 132, 134 is from the base station 108, 110. The base station 108, 110 or site controller 112, 114 also includes a scheduler 120, 122 for dynamically scheduling the transmission/reception of wireless data between wireless devices 104, 106, 132, 134 and their base station 108, 110. The dynamic scheduling mitigates interference if the base station 108, 110 becomes unsynchronized with the rest of the TDD system. The scheduler 120, 122 is discussed in greater detail below.

The wireless communication devices 104, 106, 132, 134 in one embodiment, are capable of wirelessly communicating data using the 802.16e standard or any other communication scheme that supports TDD. In another embodiment, the wireless communication devices 104, 106, 132, 134 are capable of wireless communications using other access schemes in addition to TDD. As the wireless communication devices 104, 106, 132, 134 enter a wireless communications cell they are synchronized with a respective base station 112, 114 in that cell. For example, as the wireless communication devices 104, 106, 132, 134 enter a cell they listen for a downlink communication. In one embodiment, a ranging channel allows the site controller 112, 114 to determine the how far the wireless communication devices 104, 106 are from the base station 108, 110 (via the range estimator 116, 118). In another embodiment, the distance of a wireless device 104, 106 is determined by downlink measurement reports used by the site controller 112, 114 for power control. The range estimator 116, 118 is discussed in greater detail below.

The downlink communication, in one embodiment, includes a preamble and basic control information, which allows a wireless communication device to determine downlink timing (with an error related to propagation time) and understand other basic aspects of the wireless communication system 100 such as location of uplink ranging. Once the downlink communication is observed, the wireless communication devices 104, 106, 132, 134 can access a TDD ranging channel. A base station 108, 110 via the site controller 112, 114 can determine a timing delay of a wireless device based on information received from the device on the ranging channel. The base station 108, 110 can then signal the device 104, 106, 132, 134 using a forward link to either advance or retard its timing so that the device 104, 106, 132, 134 is synchronized with other devices 104, 106, 132, 134 in the system 100.

The synchronization between the wireless communication devices 104, 106, 132, 134 is a timing synchronization for wirelessly transmitting and receiving data. Therefore, the wireless communication devices 104, 106, 132, 134 all transmit and receive data at substantially the same time. If the wireless communication devices 104, 106, 132, 134 are communicating with the base stations 108, 110 using a TDD communication channel and the wireless communication devices 104, 106, 132, 134 are not synchronized, interference is created between the devices. It should be noted that the wireless communication devices 104, 106, 132, 134 do not synchronize with each other. For example, each wireless communication device 104, 106, 132, 134 is synchronized to a synchronization timing message received from its respective base station 108, 110. Therefore, because the base stations 108, 110 are each synchronized to a given synchronization timing, the wireless communication devices 104, 106, 132, 134 are indirectly synchronized with each other. The wireless communication devices 104, 106, 132, 134 are discussed in more detail below.

Information Processing System

Figure 2:
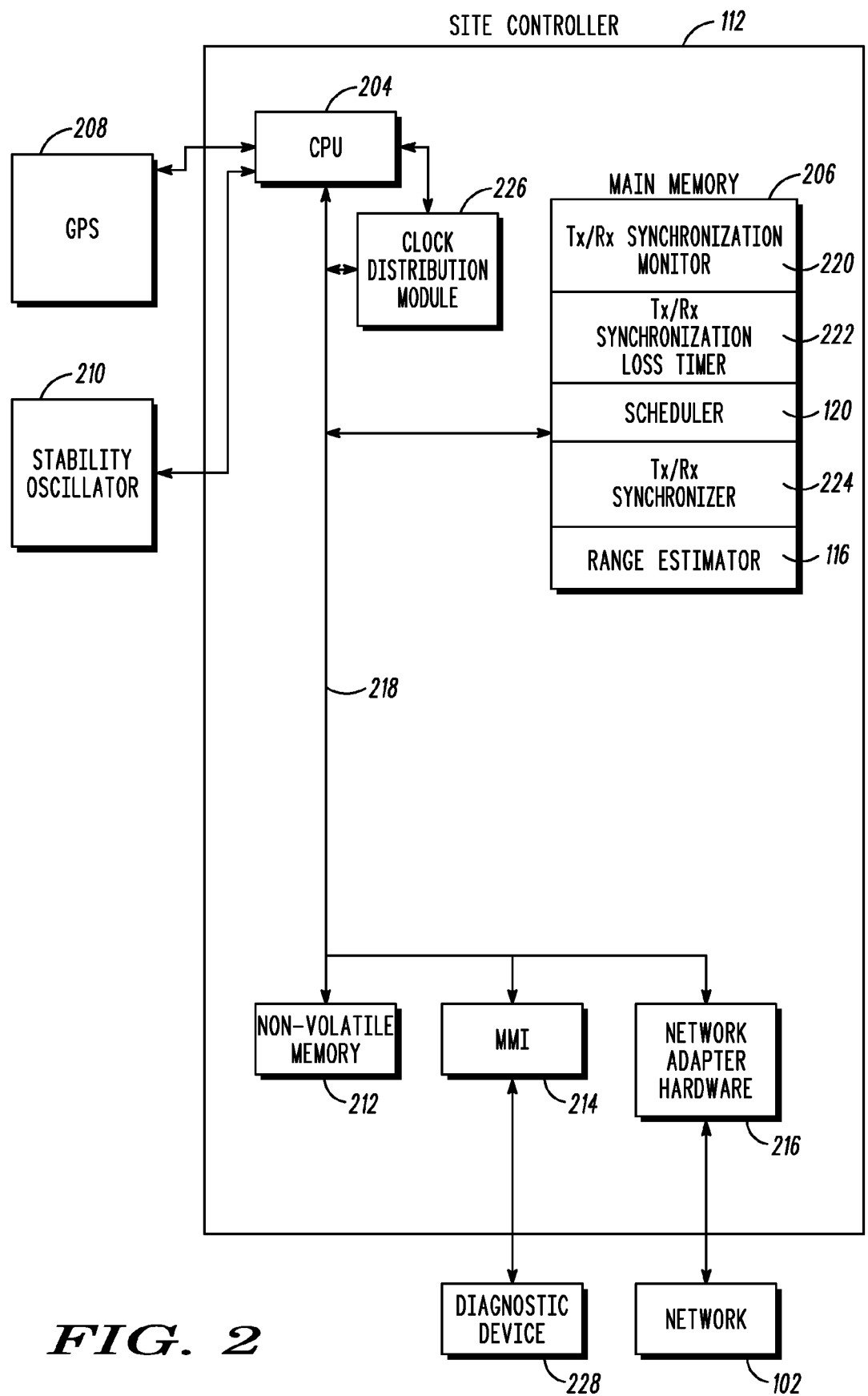
FIG. 2 is a block diagram illustrating a information processing system according, to an embodiment of the present invention.

FIG. 2 is a block diagram illustrating a more detailed view of the site controller 112 according to an embodiment of the present invention. The site controller, in one embodiment, resides within its respective base station 108. In another embodiment, the site controller 112 resides outside of and is communicatively coupled to its respective base station 108. The site controller 112 includes a processor 204 that is connected to a main memory 206 (e.g., volatile memory), a TX/RX timing synchronization means 208, a stability oscillator 210, a non-volatile memory 212, a man-machine interface ("MMI") 214, a clock generator 226, and a network adapter hardware 216. A system bus 218 interconnects these system components. The main memory 206 includes a TX/RX synchronization monitor 220, a TX/RX synchronization loss timer 222, a range estimator 116, and a TX/RX synchronizer 224. In one embodiment, these components are algorithms that can be executing in the CPU 204. Parameters for these components can reside in the main memory 206. In another embodiment these components are separate hardware components residing outside of the memory 206. The MMI 214, in one embodiment, is used to directly connect one or more diagnostic devices to the site controller 112. 218.

The TX/RX timing synchronization means 208, in one embodiment, is a Global Positioning System ("GPS") module, which provides a master clock source for the site controller 112. For example, the CPU 204 receives the clock source from the GPS module 208 and passes this clock source to a clock distribution module 226. Clock signals for the respective components of the base station 108 are generated, in one embodiment, by the clock distribution module 226 based on the master clock source received from the GPS module 208.

The master clock source provides a timing reference for the base station 108 that is used to synchronize itself and its respective wireless communication devices for transmission and reception of wireless data. A TX/RX synchronizer 224 uses the timing reference to synchronize the base station 108 for wireless transmitting and receiving data. Each of the base stations 108, 110 in the wireless communication system 100 are synchronized to a substantially common synchronization timing. In other words, the TX/RX timing synchronization means 208 communicatively coupled to each base station 108, 110 generates a substantially common synchronization timing signal. Therefore, the transmission and reception of data by each base station 108, 110 is synchronized with the other base stations 108, 110 in the wireless communication system. For example, the base stations 108, 110 are synchronized so that downlink and uplink subframes in a TDD communication frame transmitted by each base station 108, 110 are aligned. In other words, the synchronization ensures that the wireless devices 104, 106 of one base station 108, 110 are not transmitting/receiving while the other wireless devices 104, 106 of the TDD system are receiving/transmitting.

In one embodiment, the TX/RX timing synchronization is predefined and common among all of the base stations 108, 110. In other words, the base stations 108, 110 are all synchronized to a common synchronization timing. In one embodiment, wireless communication devices that are coupled to the base station 108 are also synchronized for transmission and reception of data. For example, the site controller 112 via the base station transmits synchronization information in the preamble of a downlink frame includes synchronization information for synchronizing one or more respective wireless communication devices 104. It should be noted that the timing synchronization is not limited to using GPS, other synchronization means such as backhaul information (e.g., Network Time Protocol) is also applicable to the present invention.

The stability oscillator 210, in one embodiment, is a medium stability oscillator, a high stability oscillator, or the like. The stability oscillator 210 allows the base station 108 to free-run for a period of time if the TX/RX timing synchronization means 208 fails or if a timing reference signal is lost for any reason, the TX/RX timing synchronization means 208, the stability oscillator 210 provides a timing frame of reference to the clock distribution module 226. The stability oscillator 210 has a relatively slow drift rate, e.g., 0.8 μs per hour, which extends the survivability of the communications system 100. The synchronization of the base station 108, which is with respect to a timing frame of reference that is common to the base stations 108, 110 is monitored, in one embodiment, by a TX/RX synchronization monitor 220.

The TX/RX synchronization monitor 220 detects when a loss of the timing reference has occurred. A timing reference loss can occur, for example, from a failure of the TX/RX timing synchronization means 116, loss of the GPS signal, and the like. Once a loss is detected, a TX/RX synchronization loss timer 222 starts to count a predefined time period. The TX/RX synchronization loss timer 222 is used to determine when a predefined period of time has passed since losing the time reference signal. In one embodiment, the predefined period of time correlates to a known amount of time that the stability oscillator can drift (e.g. maximum clock slip rate) before potential interference between wireless devices 104, 106 occurs.

The scheduler 120 dynamically schedules downlink and uplink transmissions so that interference between adjacent cells is minimized. For example, in an 802.16e system utilizing TDD, a frame comprises, among other things, a downlink subframe, and uplink subframe, a transmit turn guard ("TTG") portion, and a receive turn guard ("RTG") portion. The transmit turn guard is a time period where the wireless communication device 104 is transitioning from a transmitting mode to a receiving mode. In other words, the wireless communication device stops transmitting so that can receive data from the base station 108. The receive turn guard is a time period where the wireless communication device 104 is transitioning from a receiving mode to a transmitting mode.

In one embodiment, the scheduler 120 segments the downlink subframe and the uplink subframe into a plurality of "zones". For example, each of the subframes can be split into three segments. It should be noted that the subframes are not limited to being split into three subframes. Based on the estimated distance of each wireless communication device 104, 106 from its base station 108, 110, the scheduler dynamically schedules the wireless communication devices 104, 106 into one of the three zones.

For example, in the downlink subframe, transmissions to "far-away" wireless subscribers are scheduled near the center of the downlink subframe, thereby avoiding the TTG and RTG boundaries where overlap with the uplink subframe of an adjacent cell is likely to occur (which would cause interference). In the uplink subframe, for example, "far-away" users are scheduled to transmit in the middle of the three zones. The dynamic scheduling of the present invention allows for interference between adjacent cells to be minimized. For example, the dynamic scheduling prevents one wireless communication device 104, 106 in one cell from transmitting/receiving while another nearby wireless communication device 104, 106 in an adjacent cell is receiving/transmitting.

In one embodiment, all of the base stations 108, 110 communicate with one another to determine how each base station should schedule its wireless communication devices 104, 106. For example, as each base station 108. 110 determines the distance of a wireless communication device 104, 106, this information is passed on to the other base stations 108, 110 such as its immediate neighboring base stations so that intelligent scheduling of downlink and uplink subframes can be made.

In another embodiment, the dynamic scheduling discussed above is not performed until a timing reference for the TX/RX timing synchronization is lost. For example, once a timing reference loss is detected and the predefined time period corresponding to the maximum drift rate (of the stability oscillator 210) has passed, the range estimator 116 determines the distances of its wireless communication devices 04, 106. As discussed above, the range estimator 116 determines the distance of the wireless communication devices 104, 106 via the ranging channel. In another embodiment, the distance of a wireless device 104, 106 is determined by downlink measurement reports used by the site controller 112, 114 for power control. It should be noted that the distances of the wireless communication devices 104, 106 can be determined by other mechanisms such as direct signal strength measurement on uplink transmissions from each wireless subscriber.

The scheduler 120 then performs its dynamic scheduling as described above. In this embodiment, each base station 108, 110 experiencing a timing reference lost uses its own ranging information to perform the dynamic scheduling. When the timing reference is lost, uncertainty exists as to whether the base station 108 is transmitting/receiving at the same time, before, or after the other base stations 110 thereby potentially causing interference. The dynamic scheduling reduces the potential impact of the uncertainty to the rest of the system. In one embodiment, the dynamic scheduling of the downlink and uplink subframes prevents one wireless device 104 from transmitting to its base station 108 while another wireless device 106 is listening to its base station 110 and vice versa, which can cause interference. In another embodiment, the scheduling of "far-away" subscribers in the middle zone prevents those subscribers from interfering with neighbor cells, but the 'nearby' subscribers can still get scheduled in the outer zones where they can potentially interfere. However, with this scheduling scheme it is much less likely that their interference is significant because the wireless subscribers in the outer frames are farther from the neighbor cells and also transmitting at lower power levels.

In another embodiment the base stations 108, 110 coordinate with their immediate neighbor base stations to alternate scheduling of the wireless devices in their cells that are nearest the cell edges (i.e. furthest from the base station). For example, in a typical 3-sector configuration each cell has two adjacent neighbors controlled by other base stations. The base stations controlling these three adjacent cells can each partition their uplink and downlink sub-frames into 3 segments and agree a priori which of the three segments each base station is to use for scheduling their wireless devices that are furthest away. In this example, the three base stations are never simultaneously communicating with their furthest wireless devices at the same time in the uplink or downlink sub-frame, thus reducing the effect of interference between cells.

The network adapter hardware 216 is used to provide an interface to the network 102. For example, the network adapter 216, in one embodiment, provides the Ethernet connections 136, 138 between the base station 108, 110 and the wireless communications network 102. An embodiment of the present invention can be adapted to work with any data communications connections including present day analog and/or digital techniques or via a future networking mechanism.

Wireless Communication Device

Figure 3:
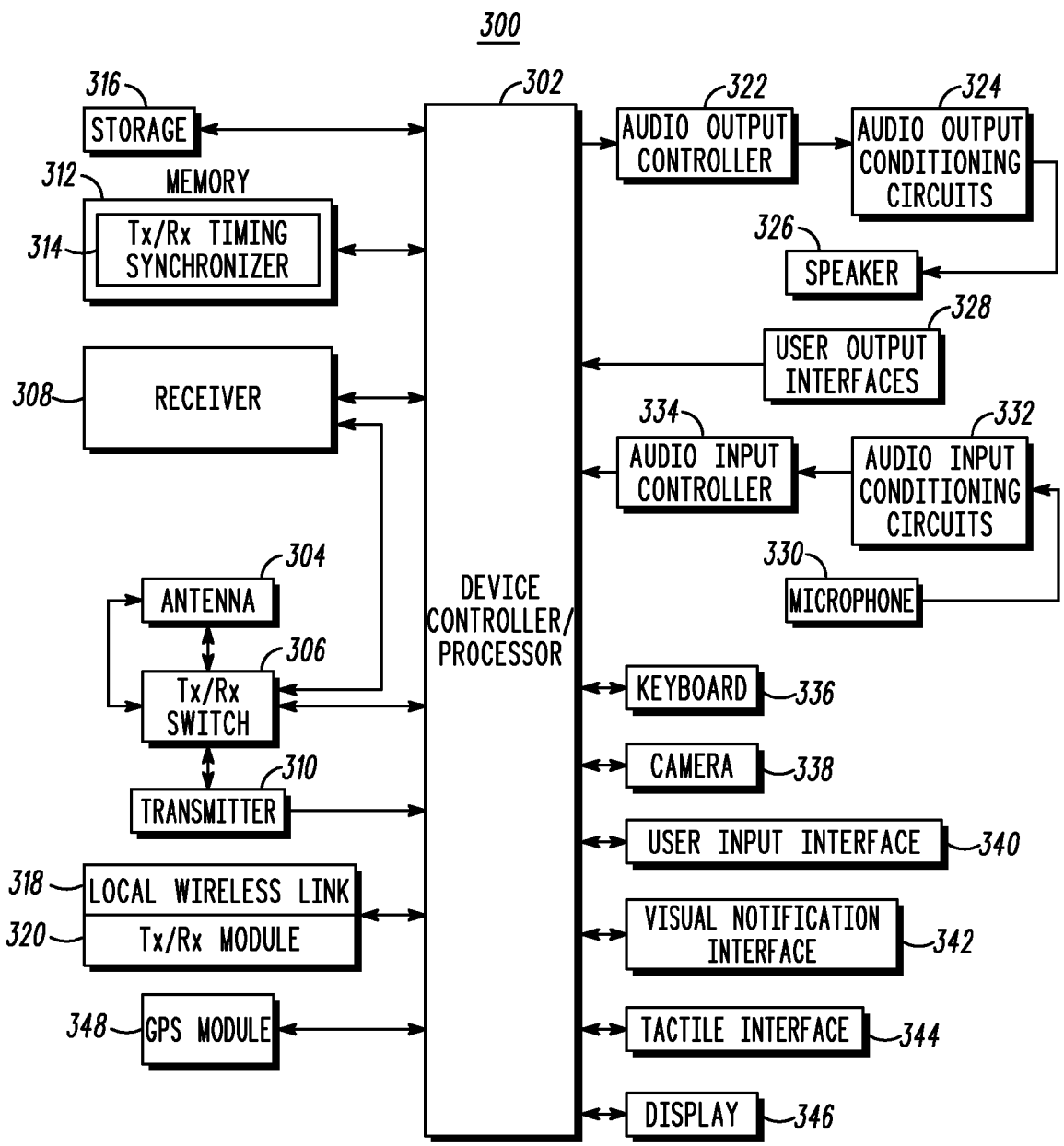
FIG. 3 is a block diagram illustrating a wireless communication device, according to an embodiment of the present invention.

FIG. 3 is a block diagram illustrating a more detailed view of the wireless communication device 104. It should be noted that other wireless communication devices such as wireless communication air interface cards 132, 134 are also compatible with the present invention. FIG. 3 illustrates only one example of a wireless communication device type. In one embodiment, the wireless communication device 104 is capable of transmitting and receiving wireless information on the same frequency such as in an 802.16e system using TDD. The wireless communication device 104 operates under the control of a device controller/processor 302, that controls the sending and receiving of wireless communication signals. In receive mode, the device controller 302 electrically couples an antenna 304 through a transmit/receive switch 306 to a receiver 308. The receiver 308 decodes the received signals and provides those decoded signals to the device controller 302.

In transmit mode, the device controller 302 electrically couples the antenna 304, through the transmit/receive switch 306, to a transmitter 310. The device controller 302 operates the transmitter and receiver according to instructions stored in the memory 312. These instructions include, for example, a neighbor cell measurement-scheduling algorithm. The memory 312 also includes a TX/RX timing synchronizer 314. The TX/RX timing synchronizer 314 synchronizes the wireless communication device 104 with its respective base station 108 for transmitting and receiving wireless information. For example, as the wireless communication device 104 enters into a cell it communicates with the base station 108 via a ranging channel. The site controller 112 determines, in one embodiment, a timing scheme needed to synchronize the wireless device with the other wireless devices and base stations in the system 100.

The wireless communication device 104 receives a timing synchronization message via the receiver 308 transmitted from the base station 108 on a reverse link. The timing synchronization message instructs the TX/RX timing synchronizer 314 to advance or retard a timing reference of the wireless device 104 thereby synchronizing the wireless device 104 with the other devices in the system 100. The wireless device 104, via the receiver, also receives scheduling information that indicates in what zone of the downlink subframe it is receiving and what zone in the uplink subframe it is transmitting in.

The wireless communication device 104 also includes non-volatile storage memory 316 for storing, for example, an application waiting to be executed (not shown) on the wireless communication device 104. The wireless communication device 104, in this example, also includes an optional local wireless link 318 that allows the wireless communication device 104 to directly communicate with another wireless device without using a wireless network (not shown). The optional local wireless link 318, for example, is provided by Bluetooth, Infrared Data Access (IrDA) technologies, or the like. The optional local wireless link 318 also includes a local wireless link transmit/receive module 320 that allows the wireless device 104 to directly communicate with another wireless communication device such as wireless communication devices communicatively coupled to personal computers, workstations, and the like.

The wireless communication device 104 of FIG. 3 further includes an audio output controller 322 that receives decoded audio output signals from the receiver 308 or the local wireless link transmit/receive module 320. The audio controller 322 sends the received decoded audio signals to the audio output conditioning circuits 324 that perform various conditioning functions. For example, the audio output conditioning circuits 324 may reduce noise or amplify the signal. A speaker 326 receives the conditioned audio signals and allows audio output for listening by a user. The audio output controller 322, audio output conditioning circuits 324, and the speaker 326 also allow for an audible alert to be generated notifying the user of a missed call, received messages, or the like. The wireless communication device 104 further includes additional user output interfaces 328, for example, a head phone jack (not shown) or a hands-free speaker (not shown).

The wireless communication device 104 also includes a microphone 330 for allowing a user to input audio signals into the wireless communication device 104. Sound waves are received by the microphone 330 and are converted into an electrical audio signal. Audio input conditioning circuits 332 receive the audio signal and perform various conditioning functions on the audio signal, for example, noise reduction. An audio input controller 334 receives the conditioned audio signal and sends a representation of the audio signal to the device controller 302.

The wireless communication device 104 also comprises a keyboard 336 for allowing a user to enter information into the wireless communication device 104. The wireless communication device 104 further comprises a camera 338 for allowing a user to capture still images or video images into memory 314. Furthermore, the wireless communication device 104 includes additional user input interfaces 340, for example, touch screen technology (not shown), a joystick (not shown), or a scroll wheel (not shown). In one embodiment, a peripheral interface (not shown) is also included for allowing the connection of a data cable to the wireless communication device 104. In one embodiment of the present invention, the connection of a data cable allows the wireless communication device 104 to be connected to a computer or a printer.

A visual notification (or indication) interface 342 is also included on the wireless communication device 104 for rendering a visual notification (or visual indication), for example, a sequence of colored lights on the display 346 or flashing one ore more LEDs (not shown), to the user of the wireless communication device 104. For example, a received multimedia message may include a sequence of colored lights to be displayed to the user as part of the message. Alternatively, the visual notification interface 342 can be used as an alert by displaying a sequence of colored lights or a single flashing light on the display 346 or LEDs (not shown) when the wireless communication device 104 receives a message, or the user missed a call.

The wireless communication device 104 also includes a tactile interface 344 for delivering a vibrating media component, tactile alert, or the like. For example, a multimedia message received by the wireless communication device 104, may include a video media component that provides a vibration during playback of the multimedia message. The tactile interface 344, in one embodiment, is used during a silent mode of the wireless communication device 104 to alert the user of an incoming call or message, missed call, or the like. The tactile interface 344 allows this vibration to occur, for example, through a vibrating motor or the like.

The wireless communication device 104 also includes a display 346 for displaying information to the user of the wireless communication device 104 and an optional Global Positioning System (GPS) module 348 The optional GPS module 348 determines the location and/or velocity information of the wireless communication device 104. This module 348 uses the GPS satellite system to determine the location and/or velocity of the wireless communication device 104. Alternative to the GPS module 348, the wireless communication device 104 may include alternative modules for determining the location and/or velocity of wireless communication device 104, for example, using cell tower triangulation and assisted GPS.

Example of Interference Between Two Wireless Communication Devices

Figure 4:
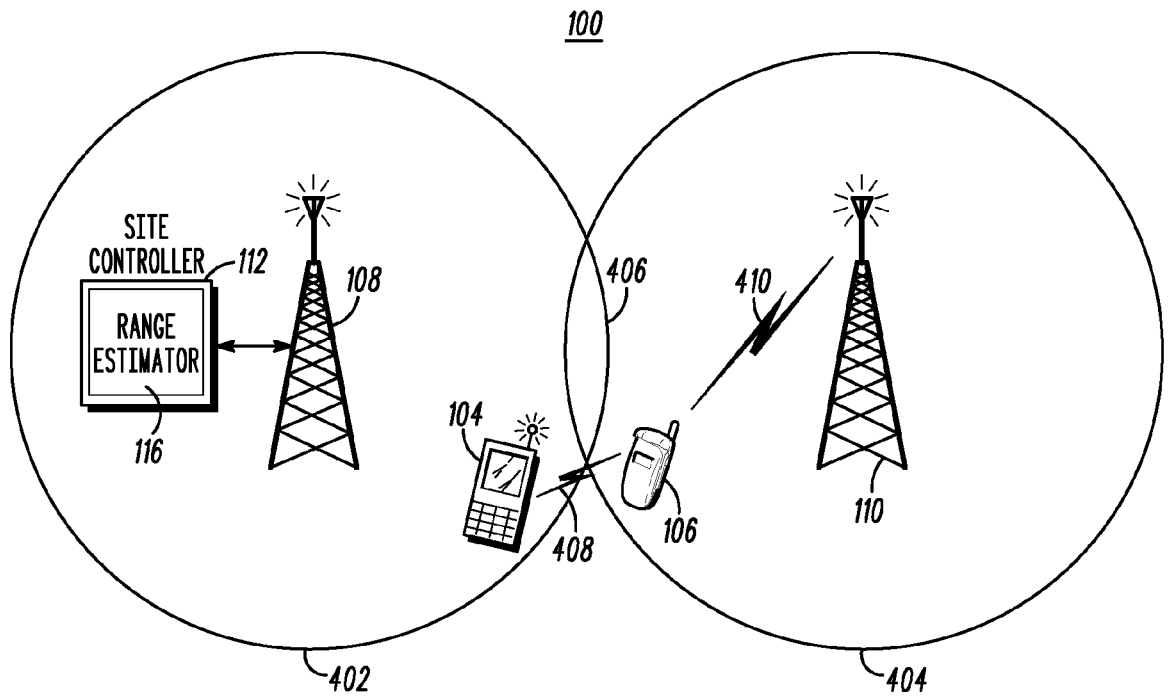
FIG. 4 is graphical representation of the system of FIG. 1 illustrating a condition where interference is shown occurring between two wireless communication devices.
Figure 5:
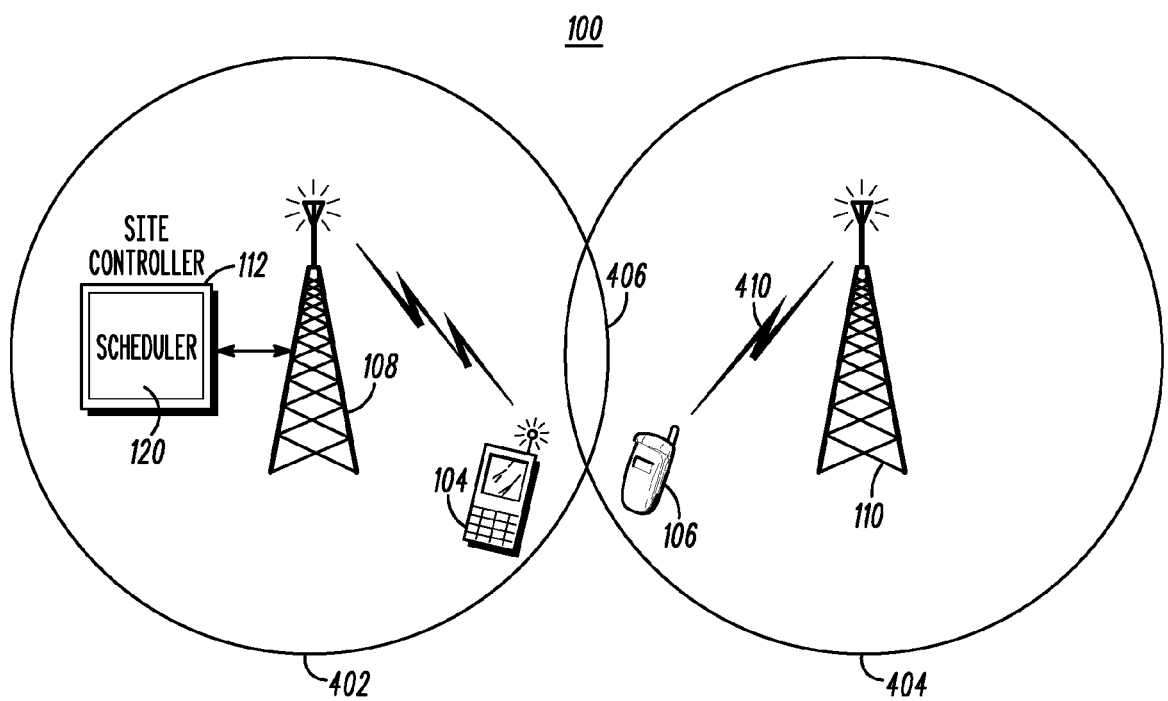
FIG. 5 is a graphical representation of the system of FIG. 1 illustrating a condition after subframes of a Time Division Duplexing frame have been segmented to mitigate the interference shown in FIG. 4, according to an embodiment of the present invention.

FIG. 4 is an illustration of the wireless communication system 100 where interference occurs between two wireless communication devices 104, 106. FIG. 5 is an illustration of the wireless communication system 100 after the dynamic scheduling described above is performed. The wireless communication devices 104, 106 are located in adjacent cells 402, 404 and are in relative close proximity to each other. FIG. 4 shows one of the wireless communication devices 104 as being unsynchronized with the remaining devices 106 in the TDD system. As discussed above, if a timing reference is lost at the base station 108, the base station 108 itself and its respective wireless devices 104 lose synchronization from the rest of the TDD system 100. Therefore, the TDD frames are unsynchronized thereby causing interference between the wireless communication devices 104, 106.

As discussed above, interference can also occur when two nearby wireless devices are located far away from their respective home base stations. The wireless devices 104, 106 are very near to one another and are simultaneously transmitting to two different base stations 108, 110 at high TX power. The signals from the two wireless devices 104, 106 arrive at both base stations at similar power levels thus making it difficult for the base stations 108, 110 to segregate the transmission they're looking for from the interfering signal. This situation can also occur on the downlink. for example, two base stations 108, 110 simultaneously transmit to two faraway wireless devices 104, 106 that are near each other. Both wireless devices 104, 106 see the signals from both base stations 108, 110 at similar power levels. In another embodiment, the wireless devices 104, 106 can be initially synchronized, but a base station(s) 108 loses it timing reference thereby causing its wireless device 104 to become unsynchronized from the rest of the system.

In one embodiment, the range estimator 116 determines the distance of each wireless device 104 in its cell 402 so that the scheduler 120, as shown in FIG. 5 can perform dynamic scheduling of the downlink and uplink subframes for a TDD communication. The scheduling can either take place as each wireless device 104, 106 enters its cell 402, 404 or that the unsynchronized device 104 could be transmitting when the other devices 106 are receiving. After the scheduling takes place, the wireless device 104 now transmits a signal 502 to its base station 108 while the other devices 106 are transmitting. In other words, the devices are transmitting and receiving during the same periods of time. The scheduling of the present invention provides, in general, that wireless subscribers near the edges of the cells transmit at times when other nearby wireless subscribers are known to be transmitting and not receiving. Therefore, the devices do not interfere with one another.

TDD Frame

Figure 6:
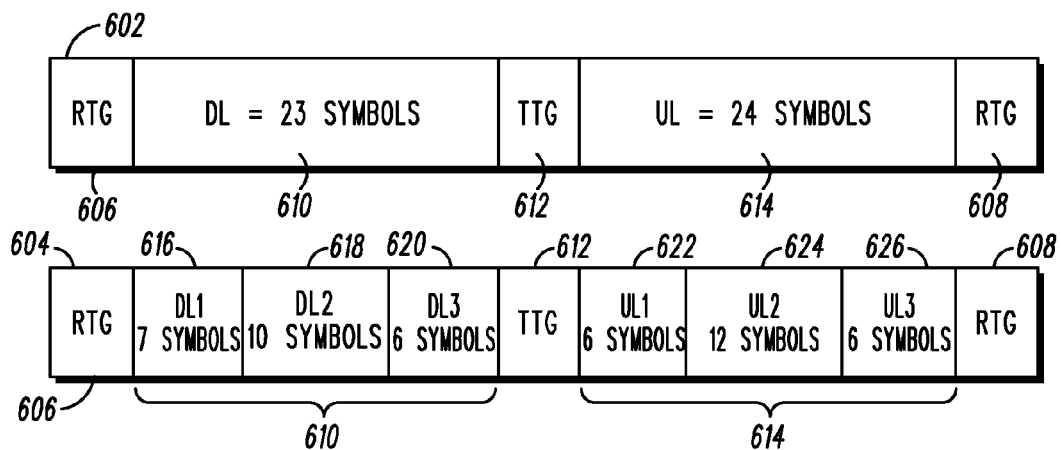
FIG. 6 is a datagram illustrating a frame structure for time division duplex communications where subframes have been segmented to mitigate transmission/receiving synchronization loss, according to an embodiment of the present invention.

FIG. 6 shows an initial TDD frame 602 for an 802.16e system and a TDD frame 604 for an 802.16e system where the downlink and uplink subframes have been segmented. The initial frame 602 comprises a plurality of subframes such an RTG 606, 608 downlink subframe 610, a TTG 612, and an uplink subframe 614. Other components of the frame such as a preamble are not shown. As discussed above, the RTG 606, 608 is a receive turn time (e.g. 50 μs), which is a period of time where a device such as a wireless communication device transitions from a receiving mode to a transmit mode. The TTG 612 is a transmit turn time (e.g. 115.7 μs), which is a period of time where a device such as a wireless communication device transitions from a receiving mode to a transmit mode.

The downlink subframe 610 has two dimensions, which are time (symbols, e.g. 23 symbols) and frequencies (tones). It should be noted that the present invention is not limited to these symbols or a fixed symbol time. A particular wireless communication device can be assigned to a symbol and/or tones within the time-frequency space of the downlink subframe 610 For example, the base station 108, 110 transmits a downlink map to each of its wireless communication devices. The wireless devices use the downlink map to identify which symbol(s) it has been assigned for receiving data from the base station 108, 110. In other embodiments, the downlink map is used to identify the symbols and tones that the device has been assigned to. In other words, the downlink map identifies when a base station 108, 110 is going to transmit to that particular device. The base station 108,110 also transmits an uplink map via a downlink to the wireless communication devices. The downlink, in one embodiment, has 30 sub-channels (uplink can have 35 sub-channels), which are groups of tones. The uplink map identifies which sub-channel and slots a particular device is assigned and the modulation and coding scheme to be used for that sub-channel. A slot, in one embodiment, is N tones by M symbols and multiple slots can be allocated to a single burst. This is true for both the uplink and downlink maps.

As discussed above, in the TDD system according to the present example the downlink subframe 610 and the uplink subframe 614 need to stay aligned between base stations 108, 110 to manage interference. To ensure that interference is minimized the scheduler 120 segments the downlink 610 and uplink 612 subframes into a plurality of zones.

The following discussion is directed towards an embodiment where a timing reference has been lost. However, as stated above, a timing reference does not have to be lost in order for the scheduler to split the downlink 610 and uplink 612 subframes into segments. For example, the downlink 610 and uplink 612 subframes can be split into segments when a near/far situation arises with a wireless subscriber device. After a timing reference is lost, the stability oscillator 210 allows for the site to free-run for a period of time. However, the stability oscillator 210 has a known maximum slip rate. This maximum slip rate is used to determine the smallest amount of time it would take for the base station 108, 110 to slip a defined amount of frame structure (i.e. a symbol or slot in 802.16e).

For example, assume a medium stability oscillator slip rate of 0.8 μs/hour (assuming 40° C. temperature change), an RTG 606, 608 of 50 μs, a TTG 612 of 115.7 μs, a downlink subframe 610 of 23 symbols at 102.857 μs per symbol, and an uplink subframe 614 of 24 symbols at 102.857 μs per symbol, and a per symbol cyclic prefix of 11.429 μs. The maximum slip that can be allowed before interference problems arise is (11.429 μs/2 μs)/(0.8 μs/hr)=14.2 hours (full CP). It should be noted that this equation assumes that a slip of a cyclic prefix duration is allowed. It should also be noted that this is only one example, other symbol times and/or durations can be used. Therefore, after this maximum holdover time (14.2 hours), the distances of the wireless devices in the cell are determined. The scheduler 120 divides the downlink subframe into a first zone 616, a second zone 618 and a third zone 620. The uplink subframe is also dived into a first zone 622, second zone 624, and a third zone 626.

The downlink subframe is segmented on slot boundaries. For example, in the downlink sub-frame, a slot is 2 consecutive symbols in the time domain. The basic unit of allocation in the downlink is 1 slot (2 symbols) by 1 sub-channel. The first symbol time in the downlink is an exception, it comprises the preamble which is only 1 symbol in the time domain. This explains why the DL1 zone 616 is 7 symbols rather than 6 like the DL3 zone 620. In the uplink sub-frame a slot is 3 consecutive symbols in the time domain. The basic unit of allocation in the uplink is one slot (3 symbols) by one sub-channel.

In the example of FIG. 6, the first downlink zone 616 is 7 symbols, the second downlink zone 618 is 10 symbols, and the third downlink zone 620 is 6 symbols equaling 23 symbols. It should be noted that this is only one example and other zone size combinations can occur. The first uplink zone 622 is 6 symbols, the second uplink zone 624 is 12 symbols, and the third uplink zone 626 is 6 symbols equaling 24 symbols. The scheduler 120, in the example of FIG. 4, schedules transmissions to "far-away" wireless subscribers in the second downlink zone 618, thereby avoiding the TTG and RTG boundaries where overlap with the uplink subframe of an adjacent cell is likely to occur (which would cause interference). The schedule 120 also schedules transmissions from "far-away" wireless devices 104, 106 in the second uplink zone 626. This minimizes the interference between the wireless communication devices 104, 106.

Process of Dynamically Scheduling TX/RX

Figure 7:
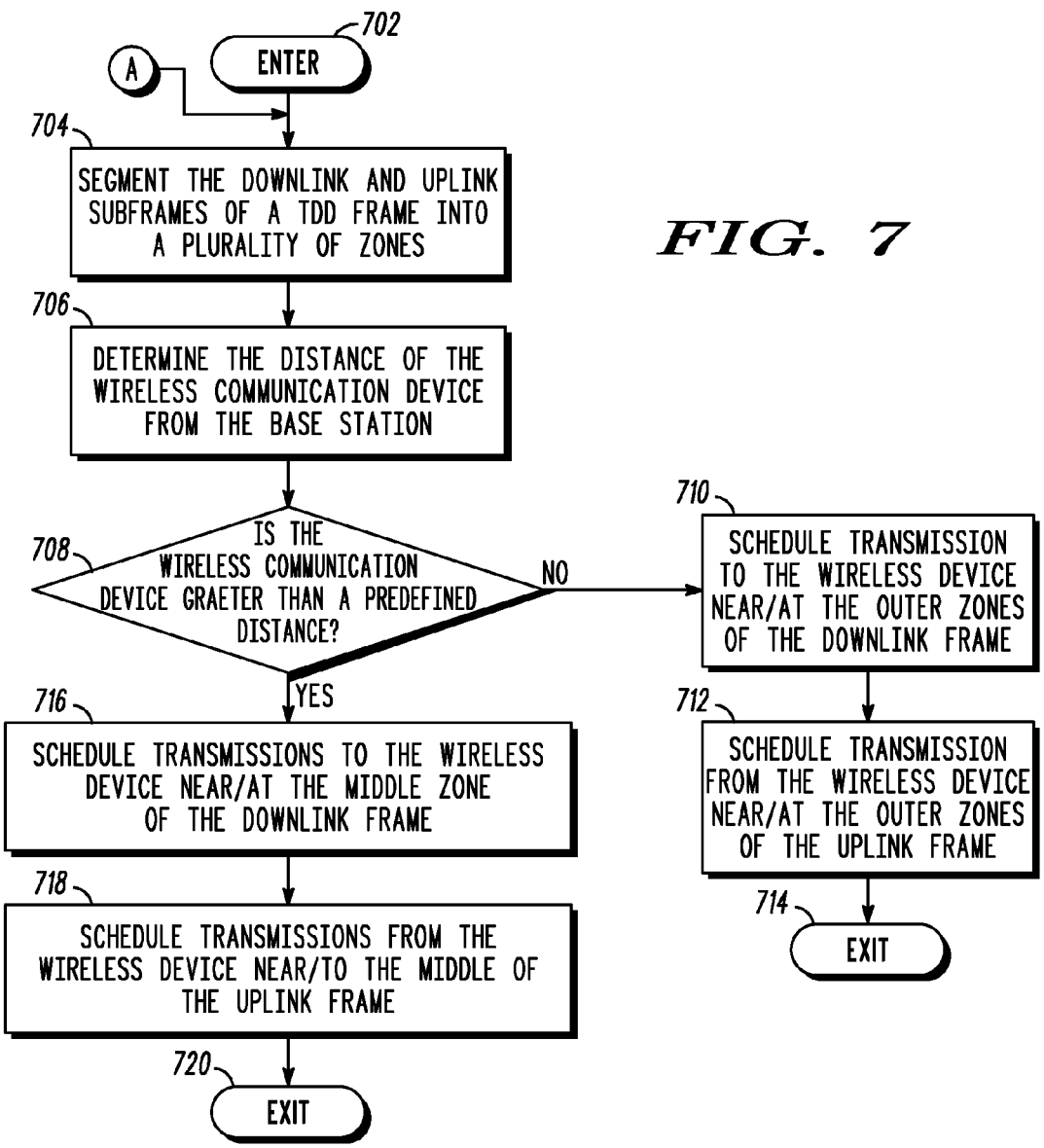
FIG. 7 is an operational flow diagram illustrating a process of scheduling uplink/downlink transmission based on the distance of a wireless device from its base station as the device enters a cell, according to an embodiment of the present invention.

FIG. 7 is an operational flow diagram illustrating a process of scheduling transmission/reception of wireless data as a wireless device enters a cell based on how far the device is from its base station. The operational flow diagram of FIG. 7 begins at step 702 and flows directly to step 704. The scheduler 120, at step 704 segments the downlink and uplink subframes 610, 612 into a plurality of zones. As a wireless device 104, 106 enters the cell, the range estimator 116 of the base station 108, 110 (or site controller 112, 114), at step 706, determines the distance of the device 104, 106 from the base station 108, 110. For example, as the wireless device 104 enters the cell it accesses a ranging channel from which the ranging estimator 116 determines the distance of the device 104. In another embodiment, the distance of a wireless device 104, 106 is determined by downlink measurement reports used by the site controller 112, 114 for power control.

The scheduler 120, at step 708, determines if the distance of the wireless communication device 104 is greater than a predefined distance. For example, the scheduler 120 can have a predefined distance threshold in which the device 104 is considered "far-away". Alternatively, the wireless communication devices 104, 106 can be partitioned into "far-away" and "nearby" proportionally according to the relative sizes of zones. For example, if zones DL1 +DL3 are 3 slots each and DL2 is 5 slots, the farthest 45% of devices get assigned to "far-away" status and the other 55% get assigned to "nearby" status. In another embodiment, the scheduler 120 determines how far away from the edge of the cell the device 104 is. The predefined threshold can be a distance that the scheduler 116 considers close enough to the edge of the cell that interference problems between a nearby device 104 in an adjacent cell can occur.

If the result of this determination is negative, the scheduler 120, at step 710, dynamically schedules transmissions to the wireless communication device 104 near/at the out zones 616, 620 of the segmented downlink subframe 610. The scheduler 120, at step 712, dynamically schedules transmission from the wireless communication device 104 near/at the outer zones 622, 626 of the segmented uplink frame 614. The control flow then exits at step 714. In one embodiment, all of the base stations 108, 110 in the TDD system communicate with one another so that each base station 108, 110 knows if one of its devices 104, 106 at a cell edge is likely to interfere with a device in an adjacent cell. In this embodiment, the scheduler also uses this information to perform its dynamic scheduling.

If the result of the determination at step 708 is positive, the scheduler 120, at step 716, dynamically schedules transmissions to the wireless device near/at the middle zone 618 of the segmented downlink subframe 610. The scheduler 120, at step 718, schedules transmissions from the wireless device near/at the middle zone 624 of the segmented uplink subframe 614. The control flow then exits at step 720.

The dynamic scheduling of the present invention allows for interference between adjacent cells to be minimized. For example, the dynamic scheduling prevents one wireless communication device 104, 106 in one cell from transmitting/receiving while another nearby wireless communication device 104,106 in an adjacent cell is receiving/transmitting.

Figure 8:
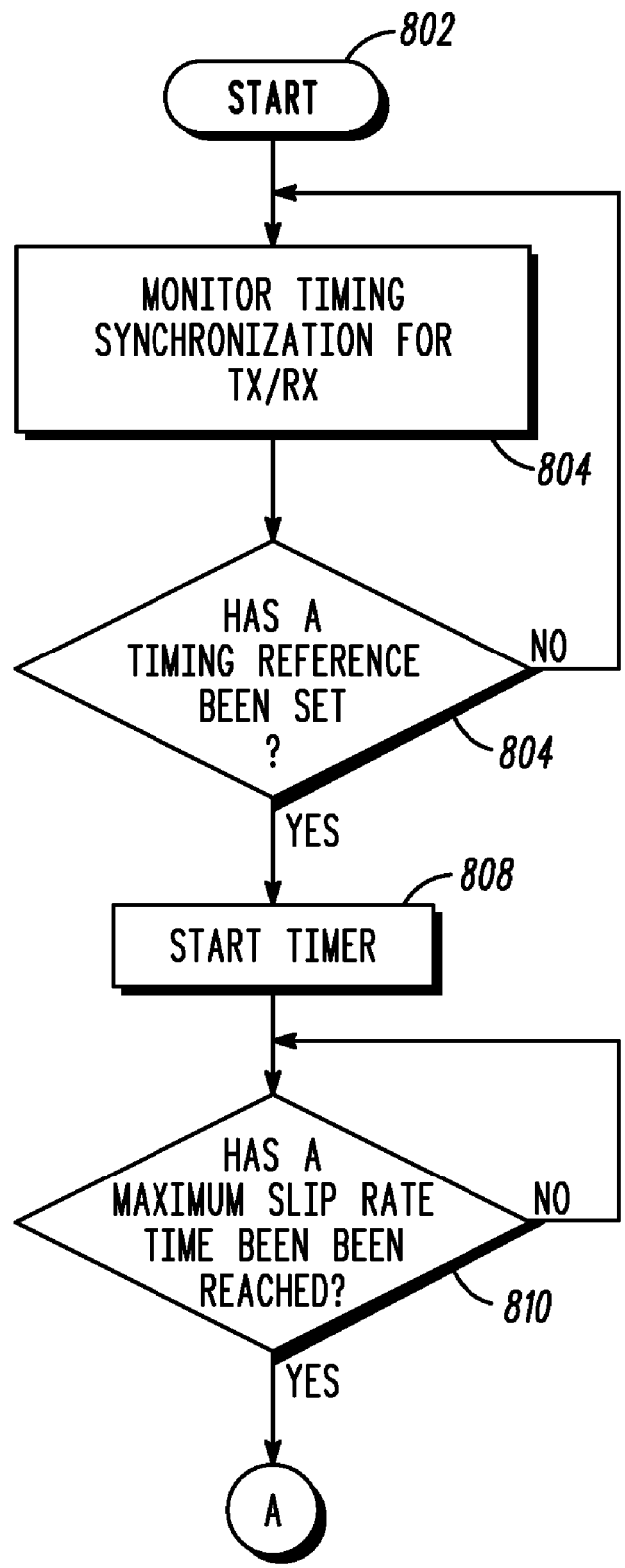
FIG. 8 is an operational flow diagram illustrating a process of scheduling uplink/downlink transmission based on the distance of a wireless device from its base station after a timing reference has been lost, according to an embodiment of the present invention.

FIG. 8 is an operational flow diagram illustrating a process of detecting a timing reference loss and subsequently scheduling transmission/reception of wireless data as described above with respect to FIG. 7. The operational flow diagram of FIG. 8 begins at step 802 and flows directly to step 804. The TX/RX synchronization monitor 220 of the site controller 112, 114, at step 804, monitors the base stations 108, 110 synchronization with the rest of the TDD system. The monitor 220, at step 806, determines if a timing reference has been lost. If the result of this determination is negative, the monitor continues to monitor the synchronization of the base station. If the result of this determination is positive, a TX/RX synchronization timer, at step 808, is started. The site controller 112, 114 determines, at step 810, if a maximum slip rate time has passed. For example, once a timing reference is lost, a stability oscillator 210 allows the base station 108, 110 and its wireless devices 104, 106 to continue transmitting and receiving without causing interference. However, the stability oscillator 210 has a known drift rate. So the site controller 112, 114 uses this known drift to determine if a maximum allowable drift time has passed before interference occurs between devices in the TDD system.

If the result of this determination is negative, the site controller 112, 114 continues to monitor if the maximum drift has passed. If the result of this determination is positive, the control flows to entry point A of FIG. 7 so that dynamic scheduling for transmissions to/from the wireless communication devices 104,106 can be performed.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, in a wireless communication system providing at least one time division duplexing communication channel, for scheduling at least one of transmission and reception of wireless data by at least one wireless communication device, the method comprising:
   determining a distance between at least one wireless communication device and a base station in a wireless communication cell;
   segmenting at least one of a downlink subframe and an uplink subframe of a time division duplexing frame into a plurality of segments; and
   scheduling the at least one wireless communication device into at least one of the plurality of segments of the downlink subframe and the uplink subframe based on the distance determined between the at least one wireless communication device and the base station and wherein the at least one wireless communication device being scheduled into at least one middle segment of the plurality of segments of the downlink subframe and the uplink subframe if the distance determined between the base station and the at least one wireless communication device is greater than a given distance threshold.

2. The method of claim 1, wherein the determining the distance further comprises at least one of:
   receiving at least one downlink measure report;
   receiving ranging data from the at least one wireless communication device; and
   directly measuring a receive signal strength of the at least one wireless communication device on an uplink signal.

3. The method of claim 1, wherein the scheduling further comprises:
   scheduling the at least one wireless communication device into at least one outer segment of the plurality of segments of the downlink subframe and the uplink subframe if the distance determined between the base station and the at least one wireless communication device is below a given distance threshold.

4. The method of claim 1, wherein the scheduling further comprises:
   scheduling the at least one wireless communication device into at least one outer segment of the plurality of segments of the downlink subframe and the uplink subframe based on determining that the wireless device is in a second proportional group of wireless devices, wherein the wireless device is placed into the second proportional group based on a size of the at least one outer segment relative to a size of at least one middle segment of the plurality of segments.

5. The method of claim 1, further comprising:
   detecting, at the base station, a loss of a timing reference, wherein the timing reference is used by the base station for timing synchronization of at least one of a transmission and reception of wireless data, and wherein the timing synchronization is predefined and common between the base station and at least one other base station in an adjacent wireless communication cell; and
   determining that a first predefined period of time has passed since the loss of the timing reference.

6. A method, in a wireless communication system providing at least one time division duplexing communication channel, for scheduling at least one of transmission and reception of wireless data by at least one wireless communication device, the method comprising:
   determining a distance between at least one wireless communication device and a base station in a wireless communication cell;
   segmenting at least one of a downlink subframe and an uplink subframe of a time division duplexing frame into a plurality of segments;
   scheduling the at least one wireless communication device into at least one of the plurality of segments of the downlink subframe and the uplink subframe based on the distance determined between the at least one wireless communication device and the base station and wherein the at least one wireless communication device being scheduled into at least one middle segment of the plurality of segments of the downlink subframe and the uplink subframe based on determining that the wireless device is in a first proportional group of wireless devices, wherein the wireless device is placed into the first proportional group based on a size of the middle segment relative to a size of at least one outer segment of the plurality of segments.

7. A wireless communications system for scheduling at least one of transmission and reception of wireless data by at least one wireless communication device, the wireless communications system comprising:
   a plurality of wireless devices;
   a plurality of base stations communicatively coupled to the plurality of wireless devices; and
   at least one information processing system communicatively coupled to the plurality of base stations, wherein the information processing system comprises:
      a range estimator for:
         determining a distance between at least one wireless communication device in the plurality of the wireless devices and a base station in the plurality of the base stations, and
         segmenting at least one of a downlink subframe and an uplink subframe of a time division duplexing frame into a plurality of segments; and
      a scheduler for scheduling the at least one wireless communication device into at least one of the plurality of segments of the downlink subframe and the uplink subframe based on the distance determined between the at least one wireless communication device and the base station and wherein the scheduler further schedules the at least one wireless communication device into at least one middle segment of the plurality of segments of the downlink subframe and the uplink subframe if the distance determined between the base station and the at least one wireless communication device is greater than a given distance threshold.

8. The wireless communications system of claim 7, wherein the determining by the range estimator further comprises at least one of:
   receiving at least one downlink measure report;
   receiving ranging data from the at least one wireless communication device; and
   directly measuring a receive signal strength of the at least one wireless communication device on an uplink signal.

9. The wireless communications system of claim 7, wherein the scheduler further schedules the at least one wireless communication device into at least one outer segment of the plurality of segments of the downlink subframe and the uplink subframe if the distance determined between the base station and the at least one wireless communication device is below a given distance threshold.

10. The wireless communications system of claim 7, wherein the scheduler further schedules the at least one wireless communication device into at least one outer segment of the plurality of segments of the downlink subframe and the uplink subframe based on determining that the wireless device is in a second proportional group of wireless devices, wherein the wireless device is placed into the second proportional group based on a size of the at least one outer segment relative to a size of at least one middle segment of the plurality of segments.

11. The wireless communications system of claim 7, wherein the information processing system further comprises:
    a synchronization monitor for detecting a loss of a timing reference, wherein the timing reference is used by the base station for timing synchronization of at least one of a transmission and reception of wireless data, and wherein the timing synchronization is predefined and common between the base station and at least one other base station in an adjacent wireless communication cell; and
    determining that a first predefined period of time has passed since the loss of the timing reference.

12. A wireless communications system for scheduling at least one of transmission and reception of wireless data by at least one wireless communication device, the wireless communications system comprising:
    a plurality of wireless devices;
    a plurality of base stations communicatively coupled to the plurality of wireless devices; and
    at least one information processing system communicatively coupled to the plurality of base stations, wherein the information processing system comprises:
        a range estimator for:
            determining a distance between at least one wireless communication device in the plurality of the wireless devices and a base station in the plurality of the base stations, and
            segmenting at least one of a downlink subframe and an uplink subframe of a time division duplexing frame into a plurality of segments; and
        a scheduler for scheduling the at least one wireless communication device into at least one of the plurality of segments of the downlink subframe and the uplink subframe based on the distance determined between the at least one wireless communication device and the base station and wherein the scheduler further schedules the at least one wireless communication device into at least one middle segment of the plurality of segments of the downlink subframe and the uplink subframe based on determining that the wireless device is in a first proportional group of wireless devices, wherein the wireless device is placed into the first proportional group based on a size of the middle segment relative to a size of at least one outer segment of the plurality of segments.

13. A site controller communicatively coupled to at least one base station for scheduling at least one of transmission and reception of wireless data by at least one wireless communication device, the site controller comprising:
    a range estimator for:
        determining a distance between at least one wireless communication device in the plurality of the wireless devices and a base station in the plurality of the base stations, and
        segmenting at least one of a downlink subframe and an uplink subframe of a time division duplexing frame into a plurality of segments; and
    a scheduler for scheduling the at least one wireless communication device into at least one of the plurality of segments of the downlink subframe and the uplink subframe based on the distance determined between the at least one wireless communication device and the base station and wherein the scheduler further schedules the at least one wireless communication device into at least one middle segment of the plurality of segments of the downlink subframe and the uplink subframe if the distance determined between the base station and the at least one wireless communication device is greater than a given distance threshold.

14. The site controller of claim 13, wherein the determining by the range estimator further comprises at least one of:
    receiving at least one downlink measure report;
    receiving ranging data from the at least one wireless communication device; and
    directly measuring a receive signal strength of the at least one wireless communication device on an uplink signal.

15. The site controller of claim 13, wherein the scheduler further schedules the at least one wireless communication device into at least one outer segment of the plurality of segments of the downlink subframe and the uplink subframe if the distance determined between the base station and the at least one wireless communication device is below a given distance threshold.

16. The site controller of claim 13, wherein the information processing system further comprises:
    a synchronization monitor for detecting a loss of a timing reference, wherein the timing reference is used by the base station for timing synchronization of at least one of a transmission and reception of wireless data, and wherein the timing synchronization is predefined and common between the base station and at least one other base station in an adjacent wireless communication cell; and
    determining that a first predefined period of time has passed since the loss of the timing reference.

17. A site controller communicatively coupled to at least one base station for scheduling at least one of transmission and reception of wireless data by at least one wireless communication device, the site controller comprising:
    a range estimator for:
        determining a distance between at least one wireless communication device in the plurality of the wireless devices and a base station in the plurality of the base stations, and
        segmenting at least one of a downlink subframe and an uplink subframe of a time division duplexing frame into a plurality of segments; and
    a scheduler for scheduling the at least one wireless communication device into at least one of the plurality of segments of the downlink subframe and the uplink subframe based on the distance determined between the at least one wireless communication device and the base station and wherein the scheduler further schedules the at least one wireless communication device into at least one middle segment of the plurality of segments of the downlink subframe and the uplink subframe based on determining that the wireless device is in a first proportional group of wireless devices, wherein the wireless device is placed into the first proportional group based on a size of the middle segment relative to a size of at least one outer segment of the plurality of segments.

* * * * *